J. DUGAN.
Hay-Press.

No. 161,871.

Patented April 13, 1875.

Witnesses
Geo. H. Strong.
Jno. L. Boone

Inventor
John Dugan
by Dewey & Co
Attys

UNITED STATES PATENT OFFICE.

JOHN DUGAN, OF SAN FRANCISCO, CALIFORNIA.

IMPROVEMENT IN HAY-PRESSES.

Specification forming part of Letters Patent No. 161,871, dated April 13, 1875; application filed March 1, 1875.

*To all whom it may concern:*

Be it known that I, JOHN DUGAN, of San Francisco city and county, State of California, have invented a Hay-Press; and I do hereby declare the following description and accompanying drawings are sufficient to enable any person skilled in the art or science to which it most nearly appertains to make and use my said invention without further invention or experiment.

My invention relates to certain improvements in the construction of horizontal presses for the purpose of compressing and baling hay and other substances, and in the means for operating the same, so that I am enabled to use a great power in compressing a single bale, and, after the bale is finished, to return the followers to their original position, to receive material for a new bale without delay.

Figure 1:
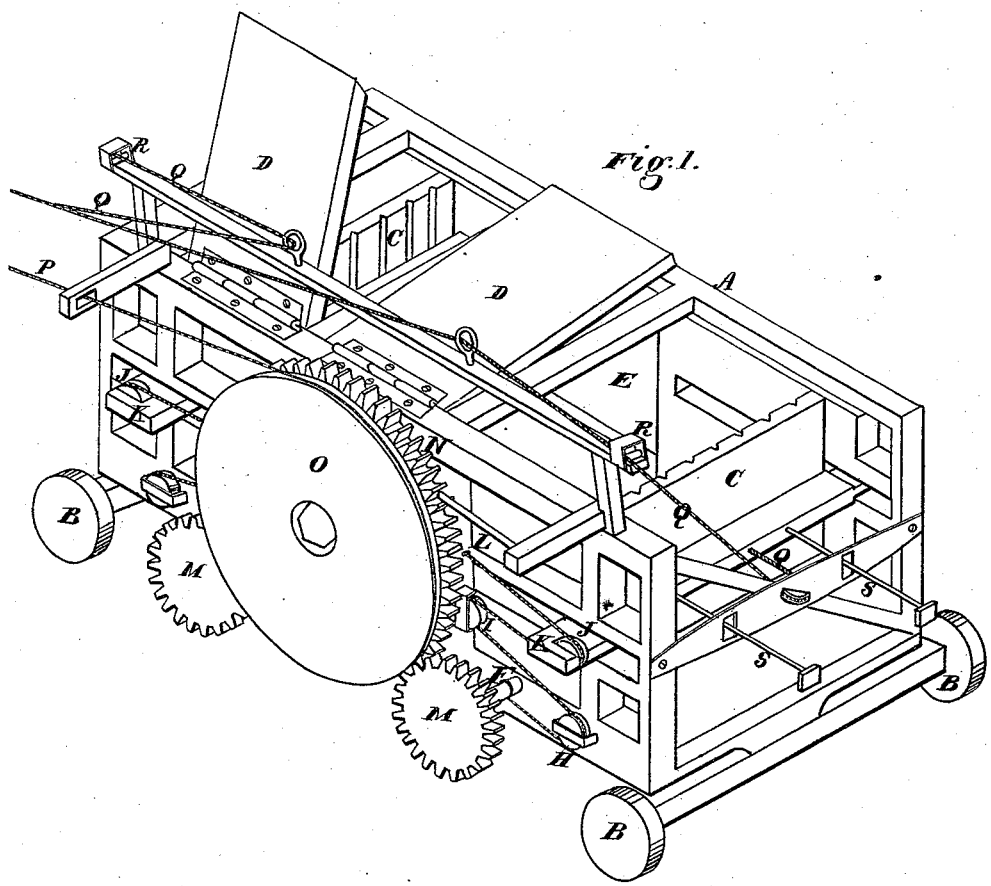
Figure 2:
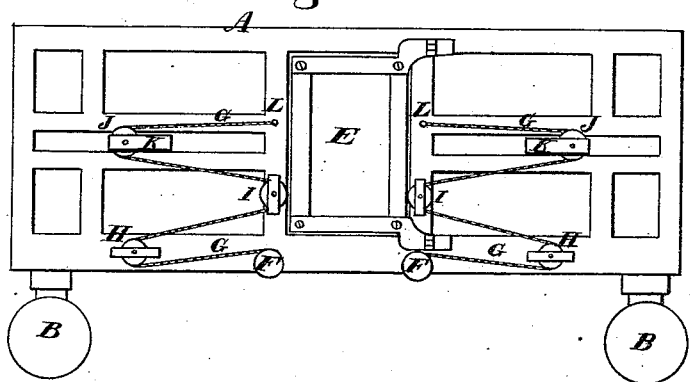

Referring to the accompanying drawing for a more complete explanation of my invention, Figure 1 is a perspective view of my press. Fig. 2 is a side elevation.

A is the body of my press, which is strongly made, and has its greatest length in a horizontal direction. This frame or body is set upon low wheels, B B, so that it can be readily moved from place, and it also gives room enough for a man to enter beneath the press to tie the bale after it is pressed. Within the body A two followers, C C, are fitted, and these followers are moved to and from the center of the press. Three doors, D D, are fitted to the top of the press, and when the followers are separated so that they stand at opposite ends of the box, hay is thrown in until the press is full. If it is necessary to tramp it, the work can be easily done by one man moving from one end to the other, as needed, until the box is full. The doors D are then closed and secured by suitable devices, and power is applied to force the followers toward each other, thus compressing the hay toward the center of the press. When the bale has been formed the strings are easily passed down through the vertical slots in the faces of the followers, and, passing through the slots in the bottom of the press, can be tied from beneath. The side door E is then opened for the removal of the finished bale, and the followers are again drawn back to the ends of the box to admit of another bale.

In order to operate the followers C, I provide a mechanism which is constructed as follows: Across the lower part of the body A two shafts, F, are extended, turning in suitable boxes, and to these shafts, where they project beyond the sides of the press, ropes or chains G are attached. These ropes are led over the pulleys H, near the end of the press, thence over pulleys I just above the shafts, and from these pulleys the chains pass over pulleys J, which are secured in the ends of the bars K of the followers, these bars projecting through slots in the sides of the box. From these pulleys the chains extend to the point L, where they are strongly secured to the frame. These chains work in pairs, one pair upon each side serving to operate each follower, and it will be seen that, by rotating the shaft F, the chains will be wound upon them and the followers drawn toward each other. In order to operate these shafts simultaneously, and in the proper direction, I fix pinions M to the ends of each, and a spur-wheel, N, is mounted upon a shaft in a line just above, and this wheel meshes with both the spur-wheels, so that when it is revolved it will turn these and the shaft F. The drum O, which receives the rope P for applying power to this mechanism, is secured to the side of the gear-wheel N, and when the power is attached to the rope the gears and shafts can be revolved.

In order to return the followers to the ends of the press after a bale is finished, I attach a rope, Q, to the middle of each of the followers at the back, and lead them thence through the ends of the press, and over suitable pulleys R, as shown.

When the horse is driven back after having pressed a bale, these ropes are so attached that the followers will be simultaneously drawn back to the ends of the press.

Guides S are secured to the backs of the followers and extend through the back of the press, so as to steady the followers in their movements.

Having thus described my invention, what I claim, and desire to secure by Letters Patent, is—

1. A press, consisting of the horizontal body A, having the two followers C C, with their guides S, in combination with the horizontal shafts F, with the gears M and N, pulleys H, I, and J, and chains G, for moving the followers toward each other simultaneously, substantially as herein described.

2. In combination with the two horizontally-moving followers F F, the ropes Q, with the pulleys R, so constructed as to withdraw the followers simultaneously to the ends of the press, substantially as herein described.

JOHN DUGAN.

Witnesses:
GEO. H. STRONG,
JNO. L. BOONE.